April 25, 1961 R. E. GEORGES 2,981,517
BLADED WHEELS, MORE PARTICULARLY FOR GAS TURBINES
Filed Aug. 18, 1958 2 Sheets-Sheet 1
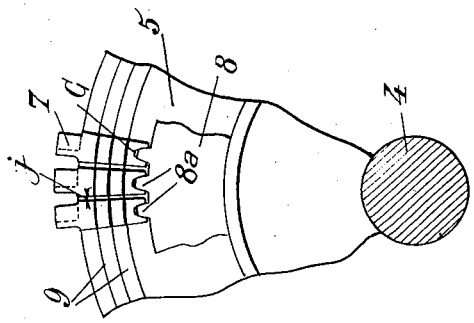
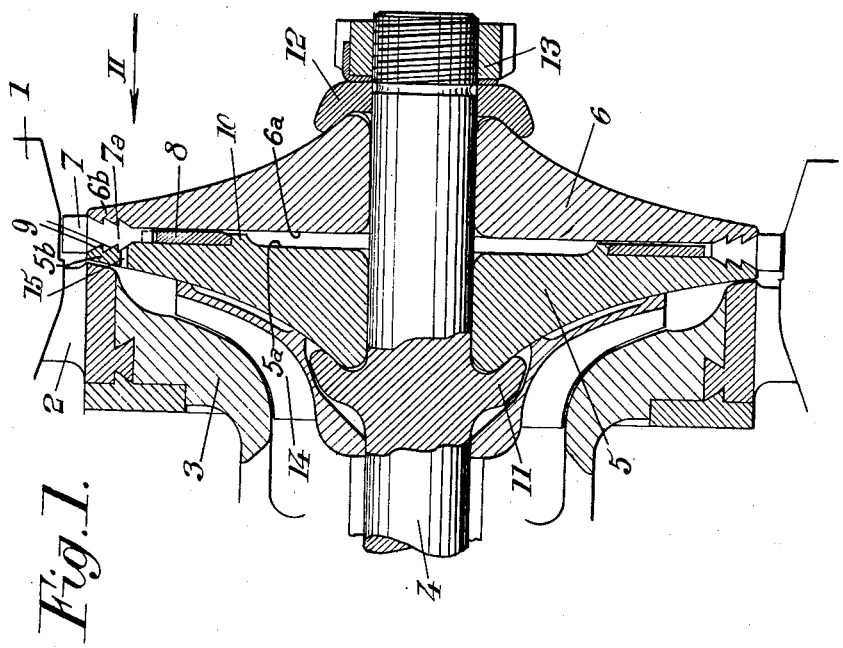

April 25, 1961  R. E. GEORGES  2,981,517
BLADED WHEELS, MORE PARTICULARLY FOR GAS TURBINES
Filed Aug. 18, 1958  2 Sheets-Sheet 2

United States Patent Office 2,981,517
Patented Apr. 25, 1961

2,981,517
BLADED WHEELS, MORE PARTICULARLY FOR GAS TURBINES

Raymond Emile Georges, 67 Ave. Foch, Paris, France

Filed Aug. 18, 1958, Ser. No. 755,660

1 Claim. (Cl. 253—77)

This invention relates to bladed wheels, that is to say, to arrangements which are essentially constituted by a wheel body carrying about the periphery a blading comprising a plurality of fitted blades, and it refers more particularly to the wheels of gas turbines.

Its object is to provide devices of this kind, which are better able than heretofore to comply with various considerations arising in practice, and in particular are such that the cost of their manufacture is reduced and that replacement of the blades may be effected in a more simple manner.

It consists primarily in forming the body of devices of the kind in question of two coaxial plates adapted to be pressed toward each other by suitable clamping means, and in holding the blades of the said devices between the opposite faces of the said plates, the angular position of the said blades being ensured by a toothed ring inserted between said two plates and rendered angularly rigid with one of them, some at least of the teeth or recesses engaging in recesses or teeth of complementary form provided in the roots of the said blades.

A preferred embodiments of my invention will now be described, by way of example, with reference to the accompanying drawing, in which Fig. 1 shows in axial section a gas turbine constructed in accordance with the invention.

Fig. 2 is an end view of this turbine in the direction of the arrow II of Fig. 1, certain parts being broken away.

Figure 4:
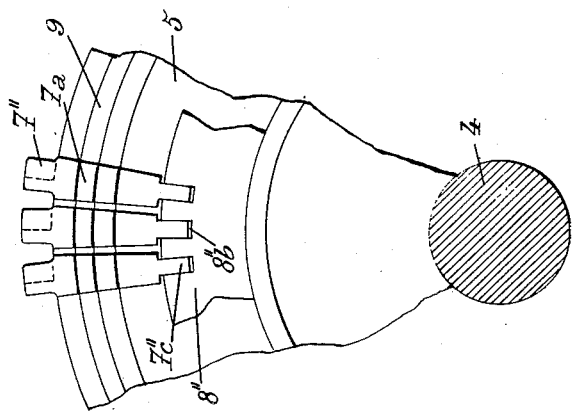
Figs 3 and 4 are views similar to Fig. 2 and showing two modifications of the bladed wheel according to the invention.

It will be supposed hereinafter that the invention is applied to the construction of a gas turbine.

As regards the power unit concerned, considered as a whole, and with the exception of the bladed wheel (or wheels) included therein, this may be constructed in any suitable fashion, and in particular it is made to comprise an outer casing 1, in which there is housed a fixed converging blading 2 adapted to direct the hot gas towards the bladed wheel of the turbine, the said fixed blades 2 being disposed between the said envelope 1 and a fixed housing 3 serving to support the shaft 4 of the turbine.

With regard to the said bladed wheel, it comprises on the one hand a wheel body constituted by two plates 5 and 6 mounted coaxially on the shaft 4 and adapted to be pressed toward each other by suitable application means, the said two plates preferably having oppositely disposed faces $5_a$ and $6_a$ parallel to one another and faces directed away from each other which slope in opposite directions, and on the other hand a plurality of fitted blades 7 distributed evenly about the periphery of the said wheel body, the roots $7_a$ of the said blades 7 being held firmly between opposite peripheral zones $5_b$ and $5_b$ of the plates 5 and 6; and finally a toothed ring 8, inserted between the plates 5 and 6, and made angularly rigid with one of them, some at least of the teeth $8_a$ of this ring engaging in recesses C of complementary form provided in the roots $7_a$ of the blades 7, thus ensuring the angular position of the said blades.

It is to be noted that between any two successive blades there should be provided a clearance $j$ sufficient to permit free expansion of the said blades.

To facilitate anchoring of the roots $7_a$ of the blades 7 it is possible to make use of one of the many solutions already proposed for this purpose, and in particular to provide said roots with a radial cusp-like section (roots of fir-tree form), the cusp-like serrations of the roots $7_a$ then engaging in circular grooves 9 provided in the oppositely disposed faces of the plates 5 and 6.

It is to be noted that in this case the blades 7 may be obtained by machining a ring (in which there have been provided lateral projections corresponding to the above mentioned serrations), which are thereafter cut radially to the size provided for in respect of the width of the blades.

As regards the angularly rigid connection between the ring 8 and one of the plates 5 and 6, for example the plate 5, this may be obtained by clamping of said ring on a shoulder 10 provided for this purpose on the particular face of the plate in question.

With regard to the application means which enable one of the plates 5 and 6 to be pressed toward the other, these are preferably such that they act on the central zones of the said plates, so that the blades 7 are gripped with a certain degree of resiliency.

For this purpose it is possible, for example, to mount the two plates 5 and 6 in sliding fashion on the shaft 4, the shaft having an axial abutment 11 in respect of the plate 5, and to provide on the shaft 4 a clamping ring 12 sliding thereon and subjected to the action of a locking nut 13 screwed onto the said shaft.

Finally, it is possible to provide means for cooling the roots of the blades 7, these means being constituted by a compressor blading 14 carried on the outer face of the plate 5, the delivery from this blading supplying passages 15 provided in said plate 5 opposite each clearance (see $j$ in Fig 2) space separating the two roots of successive blades.

On Fig. 2, the teeth of annular member 8 are supposed to be of conventional profile.

However, according to my invention, in order to facilitate the correct positioning of blade 7, when the elements of the bladed wheel are asembled together, and to permit some radial expansion of the blade roots with respect to the other elements of the wheels, the complementary teeth and recesses which are to cooperate together in order to fix every blade 7 angularly with respect to annular member 8 are arranged in such manner that, for every blade, the cooperating surfaces of the tooth and of the blade root are parallel to each other and have respective radial dimensions such that each of the blade roots can have a radial expansion different from that of the other parts without its end bearing against member 8.

Figure 3:
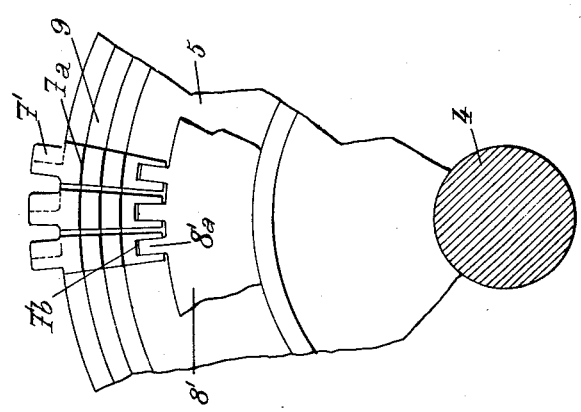

Fig. 3 illustrates the case where annular member 8' is provided with teeth $8'_a$ having parallel walls engaging, with a possibility of sliding displacements, in the recesses $7'_b$ provided in the roots of blades 7', said recesses $7'_b$ also having parallel walls.

Fig. 4 shows the case where annular member 8' is provided with recesses $8''_b$ having parallel walls between which are slidably engaged teeth $7''_c$ also having parallel walls provided at the ends of the roots of blades 7''.

Among the advantages of such a bladed wheel there may be cited more particularly its simplicity, resulting in relatively low cost of manufacture, the convenient method of machining the essential parts, as the toothed ring 8 and the recesses C may be produced on conventional gear cutting machines, its strength arising from the fact that no throughgoing removal of materal effects the resistance of plates 5 and 6, and the ready manner of replacing one or more of the blades.

What I claim is:

A bladed wheel which comprises, in combination, two discs coaxial with each other about a common axis and having respective faces located opposite each other at a small distance from each other, a multiplicity of blades having their roots caught between the peripheral portions of said disc faces, said roots and said portions of said faces including cooperating circumferential projections and recesses to hold said blades in the radial direction with respect to said discs, fixation means for pressing the central portions of said discs toward each other so that said blade roots are held between said peripheral portions of said discs, said blade roots being located adjacent to each other with a clearance in the circumferential direction between two successive blade roots to permit free expansion of said blade roots in said circumferential direction, an annular member located between said discs coaxially thereto and fixed with respect to only one of said discs so as to be prevented from rotating with respect thereto, the outer peripheral portion of said annular member being toothed, with radial teeth, the outer radius of said toothed portion being a little greater than the distance from the inner ends of said blade roots to said axis but smaller than the smaller radius of said circumferential projections and recesses, the inner ends of said blade roots having radial surfaces in sliding engagement with the radial surfaces of said teeth so as to be held in angular position with respect thereto, said radial surfaces being transverse to the planes of said faces and the respective radial dimensions of said blade roots and said annular member toothed portion leaving a radial play between each of said blade roots and said annular member.

References Cited in the file of this patent

UNITED STATES PATENTS

| | | |
|---|---|---|
| 532,232 | De Laval | Jan. 8, 1895 |
| 700,314 | Fedeler | May 20, 1902 |
| 752,340 | Holzwarth | Feb. 16, 1904 |
| 881,409 | Jude | Mar. 10, 1908 |
| 1,178,452 | London | Apr. 4, 1916 |
| 2,601,969 | Eastman | July 1, 1952 |
| 2,819,869 | Meyer | Jan. 14, 1958 |